United States Patent
Fujimoto et al.

(10) Patent No.: US 11,855,434 B2
(45) Date of Patent: Dec. 26, 2023

(54) OVERHEAD TRANSMISSION LINE SPACER

(71) Applicant: FURUKAWA ELECTRIC POWER SYSTEMS CO., LTD., Yokohama (JP)

(72) Inventors: Takeshi Fujimoto, Yokohama (JP); Kazuya Hosaka, Yokohama (JP); Ryota Aida, Yokohama (JP)

(73) Assignee: FURUKAWA ELECTRIC POWER SYSTEMS CO., LTD., Yokohama (JP)

( * ) Notice: Subject to any disclaimer, the term of this patent is extended or adjusted under 35 U.S.C. 154(b) by 721 days.

(21) Appl. No.: 17/001,359

(22) Filed: Aug. 24, 2020

(65) Prior Publication Data

US 2021/0066901 A1    Mar. 4, 2021

(30) Foreign Application Priority Data

Aug. 28, 2019   (JP) .................................. 2019-156089

(51) Int. Cl.
    *H02G 7/12*      (2006.01)

(52) U.S. Cl.
     CPC ..................................... *H02G 7/12* (2013.01)

(58) Field of Classification Search
     CPC ................. H02G 7/12; H02G 7/125
     See application file for complete search history.

(56) References Cited

U.S. PATENT DOCUMENTS

| 3,748,370 A | * | 7/1973 | Dalia | ..................... H02G 7/125 403/224 |
| 4,223,176 A | * | 9/1980 | Hawkins | ................ H02G 7/125 403/224 |

(Continued)

FOREIGN PATENT DOCUMENTS

| JP | H089544 A | 1/1996 |
| JP | 2005261030 A | 9/2005 |

(Continued)

OTHER PUBLICATIONS

[English Translation] Decision of Refusal dated Aug. 16, 2022 in JP application No. 2019-156089; pp. all.

(Continued)

*Primary Examiner* — Amy J. Sterling
(74) *Attorney, Agent, or Firm* — Dorsey & Whitney LLP (57) ABSTRACT

The present disclosure is related to providing an overhead transmission line spacer which can suppress galloping caused by strong wind in the three-conductor transmission line formed of three overhead transmission lines. An overhead transmission line spacer comprising: three clamps configured to individually hold three overhead transmission lines; and a frame body including support members and a frame portion, and configured to maintain separations between the three overhead transmission lines via the three clamps, the clamps being attached to the support members, and the frame portion maintaining separations between the support members, wherein two out of the three clamps are movable clamps, each of which is configured to hold one of the overhead transmission lines in a rotatable manner about (Continued)

the one of the overhead transmission lines, and one out of the three clamps is a fixed clamp configured to hold one of the overhead transmission lines without allowing rotation.

5 Claims, 7 Drawing Sheets

(56) References Cited

U.S. PATENT DOCUMENTS

| | | | | |
|---|---|---|---|---|
| 4,471,156 | A * | 9/1984 | Hawkins | H02G 7/125 403/162 |
| 4,480,149 | A * | 10/1984 | Hawkins | H02G 7/125 174/42 |
| 5,371,320 | A * | 12/1994 | Torok | H02G 7/125 174/42 |
| 6,008,453 | A * | 12/1999 | Richardson, Jr. | H02G 7/125 174/42 |
| 10,367,343 | B2 * | 7/2019 | Lv | H02G 7/12 |
| 2015/0229113 | A1 * | 8/2015 | Dobrinski | F16B 2/10 24/122.3 |
| 2017/0149227 | A1 * | 5/2017 | Richardson, Jr. | H02G 7/125 |
| 2018/0026430 | A1 * | 1/2018 | Talabathula | H02G 7/12 174/146 |
| 2018/0337524 | A1 * | 11/2018 | Lv | F16F 15/08 |
| 2021/0273436 | A1 * | 9/2021 | Ciesielczyk | H02G 7/20 |
| 2022/0014006 | A1 * | 1/2022 | Clement | H02G 7/12 |

FOREIGN PATENT DOCUMENTS

| | | |
|---|---|---|
| JP | 2007006624 A | 1/2007 |
| JP | 2008035672 A | 2/2008 |

OTHER PUBLICATIONS

[English Translation] Notice of Reasons for Refusal dated Jan. 24, 2022 for Japanese Patent Application No. JP2019-156089, pp. all.
Extended European Search Report for EP Application No. 21158323.2, dated Jul. 16, 2021.
Office Action dated May 3, 2023 in CA Application No. 3,090,858; pp. all.
Canadian Office Action dated Mar. 3, 2022 for Canadian Patent Application No. 3090858; pp. all.

\* cited by examiner

OVERHEAD TRANSMISSION LINE SPACER

CROSS REFERENCE TO RELATED APPLICATIONS

This application claims the benefit of Japanese Patent Application No. 2019-156089, filed Aug. 28, 2019, which is hereby incorporated by reference in its entirety.

BACKGROUND

Technical Field

The present disclosure relates to an overhead transmission line spacer to be attached to a three-conductor transmission line formed of three overhead transmission lines.

Background

In general, when ice and snow blow against a multi conductor transmission line, wing-like ice and snow accretion occurs on the windward side of respective bare conductors that form the multi conductor transmission line. Therefore, the multi conductor transmission line rises up due to strong wind, so that so-called galloping occurs. Large-scale galloping may cause deformation of the arms of a steel tower or breakage of the steel tower per se. Even small-scale galloping may become a cause of a phase-to-phase short circuit.

For this reason, as a countermeasure against galloping, the following technique is proposed. A spacer including clamps, which hold respective overhead transmission lines, is attached to a plurality of overhead transmission lines supported in a state of being arranged parallel to each other, and half of the clamps are formed of movable clamps each of which holds the overhead transmission line in a rotatable manner about the longitudinal direction of the overhead transmission line. Therefore, the plurality of overhead transmission lines are caused to have different directions of the cross-sectional shape of snow and ice accretion in order to suppress galloping (Japanese Patent Laid-Open No. 2005-261030 (Patent Literature 1)).

However, in Patent Literature 1, the conventional countermeasure against galloping which uses an overhead transmission line spacer is for a four-conductor transmission line formed of four overhead transmission lines. Further, conventionally, an overhead transmission line spacer equipped with one movable clamp is used also for a two-conductor transmission line, formed of two overhead transmission lines, to suppress galloping.

Meanwhile, for a three-conductor transmission line, formed of three overhead transmission lines, conventionally, an overhead transmission line spacer is used which is equipped with three clamps as a fixed clamp which holds an overhead transmission line without allowing rotation. However, when all of the three clamps are used as the fixed clamp, snow and ice accretion having the uniform shape is liable to occur on the three overhead transmission lines, so an effect of suppressing galloping cannot be expected for the overhead transmission line spacer used on the three-conductor transmission line.

SUMMARY

The present disclosure is related to providing an overhead transmission line spacer which can suppress galloping caused by strong wind in the three-conductor transmission line formed of three overhead transmission lines.

In the overhead transmission line spacer of the present disclosure, two out of the three clamps are movable clamps, each of which holds the overhead transmission line in a rotatable manner about the overhead transmission line, and one out of the three clamps is a fixed clamp which holds the overhead transmission line in a fixed manner without allowing rotation. Therefore, the three overhead transmission lines are caused to have different cross-sectional shapes of snow and ice accretion.

The gist of the configuration of the present disclosure is as follows.

[1] An overhead transmission line spacer including:
three clamps configured to individually hold three overhead transmission lines; and
a frame body including support members and a frame portion, and configured to maintain separations between the three overhead transmission lines via the three clamps, the clamps being attached to the support members, and the frame portion maintaining separations between the support members, wherein
two out of the three clamps are movable clamps, each of which is configured to hold one of the overhead transmission lines in a rotatable manner about the one of the overhead transmission lines, and one out of the three clamps is a fixed clamp configured to hold one of the overhead transmission lines without allowing rotation.

[2] The overhead transmission line spacer according to [1], wherein in at least one out of two movable clamps, a holding portion configured to hold the one of the overhead transmission lines rotates about the one of the overhead transmission lines within a range of rotation angles between −90° and 90° with a straight line connecting a center portion of the holding portion in a direction perpendicular to a longitudinal direction of the one of the overhead transmission lines and the support member taken as a reference position.

[3] The overhead transmission line spacer according to [1] or [2], wherein the fixed clamp is positioned upward of the at least one movable clamp.

[4] The overhead transmission line spacer according to any one of [1] to [3], wherein a range of rotation angles of the movable clamp positioned on a top side is equal to a range of rotation angles of the movable clamp positioned on a bottom side.

[5] The overhead transmission line spacer according to claim [2], wherein the movable clamp rotates about one of the overhead transmission lines within a range of rotation angles of equal to or more than a range between −70° and 70° and equal to or less than a range between −90° and 90° with the straight line taken as a reference position.

According to a first aspect of the present disclosure, two out of the three clamps equipped to the overhead transmission line spacer, which is to be attached to a three-conductor transmission line, are movable clamps each of which is configured to hold the overhead transmission line in a rotatable manner about the overhead transmission line, and the remaining one clamp is a fixed clamp configured to hold the overhead transmission line without allowing rotation. Therefore, the three overhead transmission lines have different cross-sectional shape of snow and ice accretion and hence, galloping caused by strong wind in the three-conductor transmission line can be suppressed.

According to a second aspect of the present disclosure, the holding portion of the movable clamp has a range of rotation angles between −90° and 90° and hence, snow and ice accretion on the overhead transmission line can be effectively suppressed and hence, galloping caused by strong wind can be suppressed with certainty.

According to a third aspect of the present disclosure, the fixed clamp is positioned upward of at least one movable clamp and hence, vibrations of the three-conductor transmission line in a top and bottom direction are particularly suppressed and hence, galloping caused by strong wind can be suppressed with more certainty.

According to a fourth aspect of the present disclosure, the range of rotation angles of the movable clamp positioned on the top side is equal to the range of rotation angles of the movable clamp positioned on the bottom side and hence, vibrations of the three-conductor transmission line in the top and bottom direction can be further suppressed.

DETAILED DESCRIPTION

Figure 1:
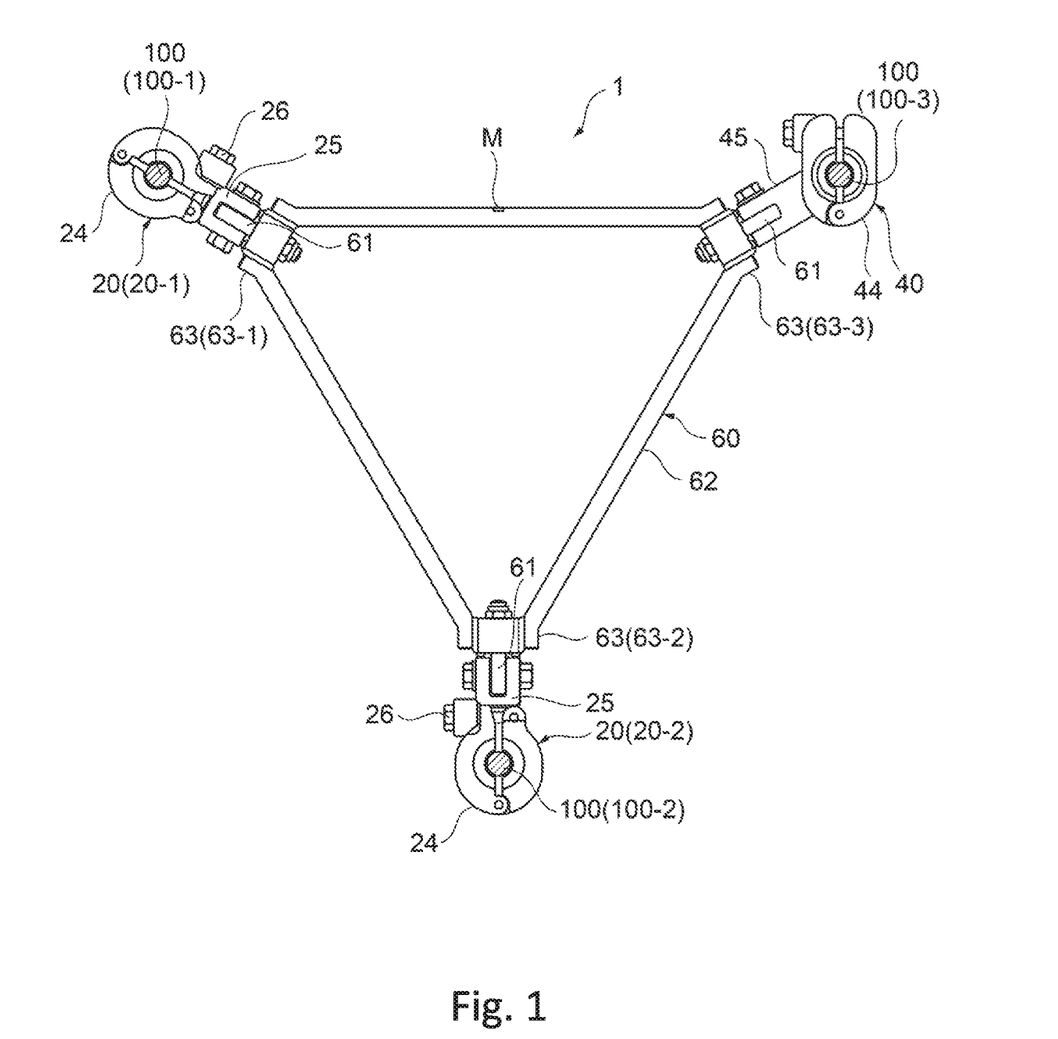
FIG. 1 is a front view for describing the state of an overhead transmission line spacer according to an embodiment of the present disclosure as viewed in the direction along overhead transmission lines.
Figure 2:
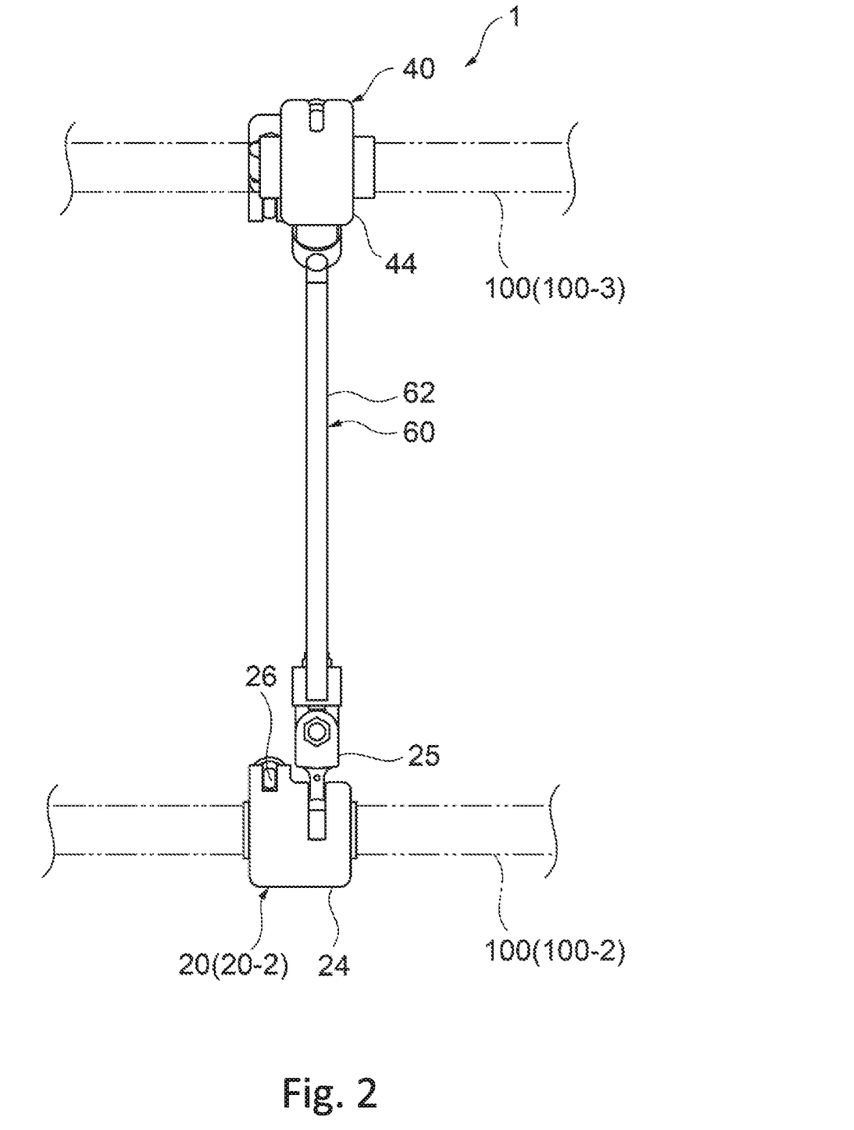
FIG. 2 is a side view for describing the state of the overhead transmission line spacer according to the embodiment of the present disclosure as viewed in the direction perpendicular to the direction along the overhead transmission lines.

Hereinafter, an overhead transmission line spacer according to an embodiment of the present disclosure will be described. FIG. 1 is a front view for describing the state of the overhead transmission line spacer according to the embodiment of the present disclosure as viewed in the direction along overhead transmission lines. FIG. 2 is a side view for describing the state of the overhead transmission line spacer according to the embodiment of the present disclosure as viewed in the direction perpendicular to the direction along the overhead transmission lines.

An overhead transmission line spacer 1 according to the embodiment of the present disclosure is attached to extend between a plurality of overhead transmission lines 100, which are supported in parallel, in order to maintain a constant separation between the overhead transmission lines 100. The overhead transmission line spacer 1 is a three-conductor transmission line spacer attached to three overhead transmission lines 100-1, 100-2, 100-3 supported in parallel.

As shown in FIG. 1, the overhead transmission line spacer 1 includes a first movable clamp 20-1, a second movable clamp 20-2, a fixed clamp 40, and a frame body 60. The first movable clamp 20-1 is a movable clamp 20 which holds the overhead transmission line 100-1. The second movable clamp 20-2 is a movable clamp 20 which holds the overhead transmission line 100-2. The fixed clamp 40 holds the overhead transmission line 100-3. The frame body 60 maintains separations between the three overhead transmission lines 100 via the movable clamps 20 and the fixed clamp 40. The frame body 60 is equipped with the movable clamps 20 and the fixed clamp 40, In the overhead transmission line spacer 1, two out of three clamps are movable clamps 20, and the remaining one clamp is the fixed clamp 40.

All of the first movable clamp 20-1, the second movable clamp 20-2, and the fixed clamp 40 are attached to the frame body 60. The movable clamp 20 has a function of holding the overhead transmission line 100 in a rotatable manner about the overhead transmission line 100. Whereas the fixed clamp 40 has a function of holding the overhead transmission line 100 without allowing rotation.

The frame body 60 has an inverted triangular shape when viewed in the direction along the overhead transmission lines 100. The first movable clamp 20-1, the second movable clamp 20-2, and the fixed clamp 40 are attached to the frame body 60 at any corner portions 63, consisting of three corner portions 63-1, 63-2, 63-3, of an inverted triangular shape of the frame body 60. In the overhead transmission line spacer 1, the corner portion 63-1 and the corner portion 63-3 are positioned on the top side, while the corner portion 63-2 is positioned on the bottom side. Further, the corner portion 63-1 and the corner portion 63-3 are positioned at the same height.

Two out of the three clamps equipped to the overhead transmission line spacer 1 are the movable clamps 20, and the remaining one clamp is the fixed clamp 40 and hence, the three overhead transmission lines 100-1, 100-2, 100-3 have different torsional rigidities. In the case where the overhead transmission lines 100 have different torsional rigidities, the overhead transmission lines 100 having different torsional rigidities have different cross-sectional shapes of snow and ice accretion. Therefore, it is possible to prevent the generation of a uniform lift caused by strong wind and hence, galloping caused by strong wind in the three-conductor transmission line can be suppressed.

The first movable clamp 20-1, the second movable clamp 20-2, and the fixed clamp 40 may be attached to any corner portions 63, consisting of three corner portions 63-1, 63-2, 63-3 of a triangular shape. In other words, the first movable clamp 20-1 and the second movable clamp 20-2 may be attached to the corner portions 63 on the top side, and the fixed clamp 40 may be attached to the corner portion 63 on the bottom side. Alternatively, as shown in FIG. 1, the first movable clamp 20-1 and the fixed clamp 40 may be attached to the corner portions 63 on the top side, and the second movable clamp 20-2 may be attached to the corner portion 63 on the bottom side. In the case where the first movable clamp 20-1 and the fixed clamp 40 are attached to the corner portions 63 on the top side, and the second movable clamp 20-2 is attached to the corner portion 63 on the bottom side, the fixed clamp 40 is positioned upward of the second movable clamp 20-2.

Of such configurations, from a viewpoint of suppressing vibrations of the overhead transmission lines 100 in the top and bottom direction, thus suppressing galloping caused by strong wind with more certainty, it is preferable that the fixed clamp 40 be positioned upward of the second movable clamp 20-2.

As shown in FIG. 2, in the overhead transmission line spacer 1, the first movable clamp 20-1, the second movable clamp 20-2, and the fixed clamp 40 attached to the corner portions 63 of the frame body 60 are positioned on the same plane. Further, the first movable clamp 20-1 and the fixed clamp 40 are positioned in the vertical direction of the second movable clamp 20-2.

Figure 3:
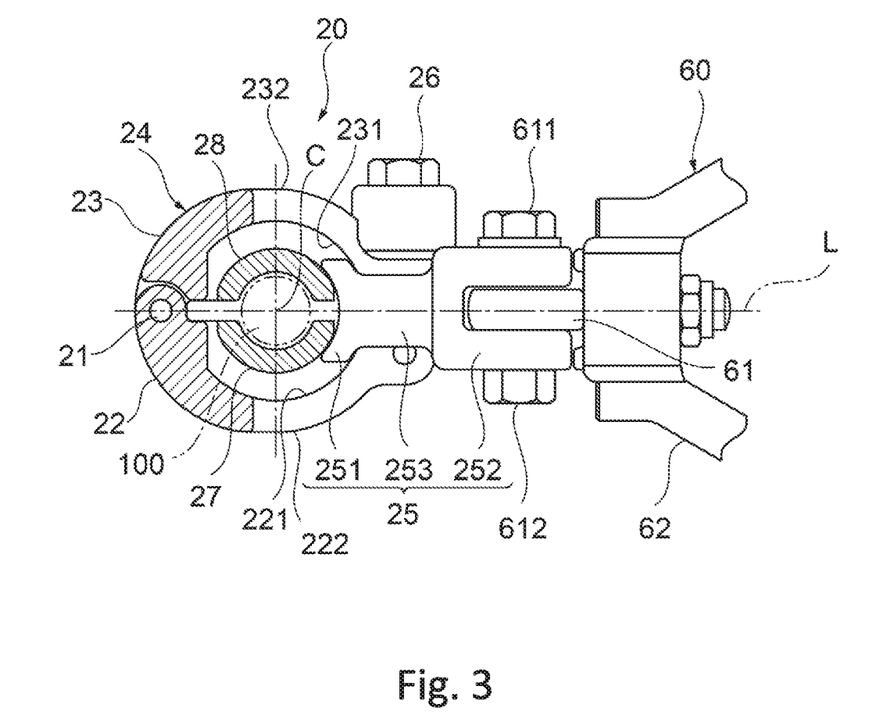
FIG. 3 is a front view of a movable clamp, equipped to the overhead transmission line spacer according to the embodiment of the present disclosure, in a non-rotated state as viewed in the direction along the overhead transmission lines.
Figure 4:
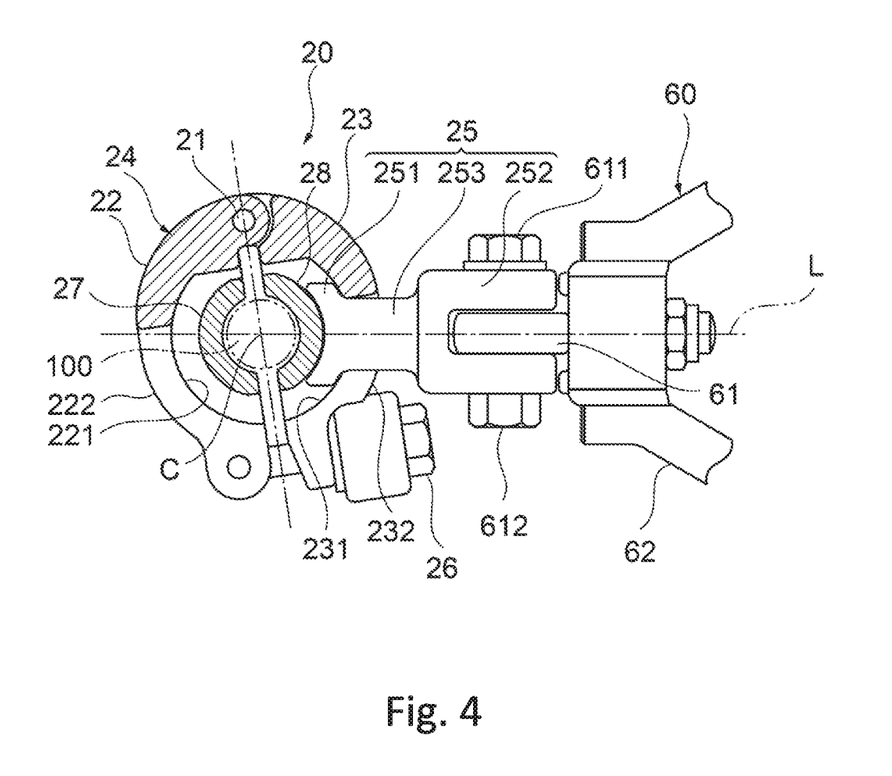
FIG. 4 is a front view of the movable clamp, equipped to the overhead transmission line spacer according to the embodiment of the present disclosure, in a fully-rotated state as viewed in the direction along the overhead transmission lines

Next, the structure of the movable clamp 20 will be described. FIG. 3 is a front view of the movable clamp, equipped to the overhead transmission line spacer according to the embodiment of the present disclosure, in a non-rotated state as viewed in the direction along the overhead transmission lines. FIG. 4 is a front view of the movable clamp, equipped to the overhead transmission line spacer according to the embodiment of the present disclosure, in a fully-rotated state as viewed in the direction along the overhead transmission lines.

For the movable clamp 20, any movable clamp may be used provided that the movable clamp is a commonly used movable clamp. As shown in FIGS. 3, 4, the movable clamp 20 includes, for example, a holding portion 24, a connecting member 25, a fastening member 26, and collars 27, 28. The holding portion 24 is formed of a first holding member 22 and a second holding member 23 which are connected with each other via a hinge structure 21 to hold the overhead transmission line 100. The connecting member 25 connects the holding portion 24 and the frame body 60 with each other, and supports the holding portion 24 in a rotatable manner about the overhead transmission line 100 which is hold. The fastening member 26 maintains a holding state brought about by the first holding member 22 and the second holding member 23. The collars 27, 28 are interposed when the overhead transmission line 100 is held by the first holding member 22 and the second holding member 23.

The first holding member 22 and the second holding member 23 are kept in a state where one end portion (base end portion) of the first holding member 22 and one end portion (base end portion) of the second holding member 23 are connected with each other by the hinge structure 21, and another end portion (rotation end portion) of the first holding member 22 and another end portion (rotation end portion) of the second holding member 23 are positioned close to each other by the fastening member 26. The first holding member 22 and the second holding member 23 are connected with each other by the hinge structure 21 such that the first holding member 22 and the second holding member 23 are rotatable to each other. An example of the fastening member 26 may be a fastening unit including a bolt and a nut.

When the first holding member 22 and the second holding member 23 are in a holding state where the rotation end portion of the first holding member 22 and the rotation end portion of the second holding member 23 are positioned close to each other, the profile of the first holding member 22 and the profile of the second holding member 23 form a substantially columnar shape, and the overhead transmission line 100 is held at the center position of the substantially columnar shape along the center line of the substantially columnar shape. Further, the first holding member 22 and the second holding member 23 hold the overhead transmission line 100 via the semi-cylindrical collars 27, 28, provided at the center position of the substantially columnar shape, without coming into direct contact with the overhead transmission line 100. When the first holding member 22 and the second holding member 23 are brought into the holding state, the collars 27, 28 are brought into a substantially cylindrical shape, so that the overhead transmission line 100 can be held on the inner side of the collars 27, 28.

Either one of both the first holding member 22 and the second holding member 23 has a step in the inside, and a hollow space having inner peripheral surfaces 221, 231 is formed about the overhead transmission line 100 which is held. Further, the outer peripheral surface of the first holding member 22 and the outer peripheral surface of the second holding member 23 respectively have cutouts 222, 232 each of which communicates with the hollow space and extends from the rotation end portion toward the proximal end of the holding member. These cutouts cooperate with the collars 27, 28 to form a structure for allowing the connecting member 25 to support the holding portion 24 in a rotatable manner.

As shown in FIGS. 3, 4, the connecting member 25 is formed of a base portion 251, a head portion 252, and a neck portion 253. The base portion 251 is connected to the holding portion 24. The head portion 252 is connected to the support member 61 side of the frame body 60. The neck portion 253 connects the base portion 251 and the head portion 252 with each other. The base portion 251 of the connecting member 25 is formed into a plate shape which is bent in an arc shape when viewed in the direction along the overhead transmission lines. The inner diameter of the base portion 251 is designed to be substantially equal to or slightly larger than the outer diameter of the collars 27, 28. The outer diameter of the base portion 251 is designed to be substantially equal to or slightly smaller than the inner diameter of the inner peripheral surface 221 of the first holding member 22 and the inner peripheral surface 231 of the second holding member 23. Therefore, the base portion 251 is allowed to move in a space formed between the outer surfaces of the collars 27, 28 and the inner peripheral surface 221 of the first holding member 22 and the inner peripheral surface 231 of the second holding member 23 while sliding on the collars 27, 28, the first holding member 22 and the second holding member 23. Accordingly, the base portion 251 of the connecting member 25 can support the holding portion 24 in a rotatable manner about the overhead transmission line 100.

As shown in FIGS. 3, 4, the neck portion 253 has a substantially plate shape, and is in a state of being inserted into the cutout 222 of the first holding member 22 and the cutout 232 of the second holding member 23. When the holding portion 24 rotates on the base portion 251 side, the neck portion 253 moves relative to the holding portion 24 along the cutouts 222, 232. Therefore, the cutouts 222, 232 specify the range of an angle within which the holding portion 24 is rotatable with respect to the connecting member 25. Assume the case where a state where the head portion 252 of the connecting member 25 faces toward the rotation end portion of the first holding member 22 and the rotation end portion of the second holding member 23 is taken as the reference position, that is, the case where a straight line L connecting a center portion C of the holding portion 24 and the center axis of a support member 61 in a direction perpendicular to the longitudinal direction of the overhead transmission line 100 is taken as the reference position. In such a case, in the movable clamp 20, the terminal ends of the cutouts 222, 232 come into contact with the neck portion 253, and the holding portion 24 is rotatable by up to 80 degrees in both a normal direction and a reverse direction (a clockwise direction and a counterclockwise direction).

As described above, in the case where the straight line L is taken as the reference position, the movable clamp 20 rotates about the overhead transmission line 100 within a range of rotation angles between −80° and 80°. The rotation angle of the movable clamp 20 with the straight line L taken as the reference position is not particularly limited. However, from a viewpoint of effectively suppressing snow and ice accretion on the overhead transmission lines 100 and of suppressing galloping caused by strong wind with certainty, it is preferable that at least one out of two movable clamps 20 have a range of rotation angles of equal to or less than a range between −90° and 90°, and it is particularly preferable that at least one out of the two movable clamps 20 have a range of rotation angles of equal to or more than a range between −70° and 70° and equal to or less than a range between −90° and 90° with the straight line L taken as the reference position.

The two movable clamps 20 may have the same or different ranges of the rotation angles. However, from a viewpoint of suppressing vibrations of the three-conductor transmission line in the top and bottom direction with certainty and a viewpoint of reducing the number of components, it is preferable that the two movable clamps 20 have the same range of rotation angles. Further, the first movable clamp 20-1 and the fixed clamp 40 are attached to the corner portions 63 on the top side, the second movable clamp 20-2 is attached to the corner portion 63 on the bottom side, and the range of rotation angles of the first movable clamp 20-1 is equal to the range of rotation angles of the second movable clamp 20-2. Therefore, vibrations of the three-conductor transmission line in the top and bottom direction can be further suppressed and hence, an effect of suppressing galloping is further increased.

As shown in FIGS. 3, 4, the distal end portion of the head portion 252 is formed into a bifurcated shape, and through holes each having a circular shape are respectively formed in portions of the bifurcated portion along a direction orthogonal to the direction along the overhead transmission lines and to the longitudinal direction of the connecting member 25. One end portion of the support member 61, provided to the frame body 60, is inserted into the bifurcated portion of the head portion 252, a bolt 611 is inserted into a through hole formed in the one end portion of the support member 61 and the through holes formed in the head portion 252, and a nut 612 is fastened. With such operations, the frame body 60 and the connecting member 25 are connected with each other.

Figure 5:
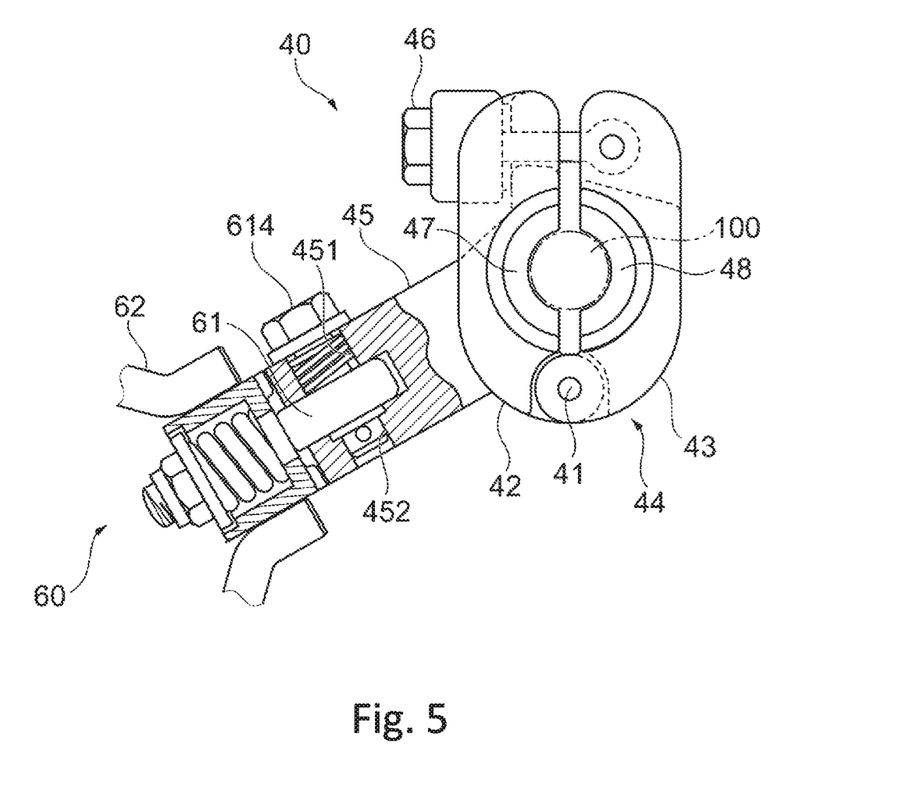
FIG. 5 is a front view of a fixed clamp equipped to the overhead transmission line spacer according to the embodiment of the present disclosure as viewed in the direction along the overhead transmission lines.

Next, the structure of the fixed clamp 40 will be described. FIG. 5 is a front view of the fixed clamp equipped to the overhead transmission line spacer according to the embodiment of the present disclosure as viewed in the direction along the overhead transmission lines.

For the fixed clamp 40, any fixed clamp may be used provided that the fixed clamp is a commonly used fixed clamp. The fixed clamp 40 has a function of holding the overhead transmission line 100 in a fixed manner without allowing rotation. As shown in FIG. 5, the fixed clamp 40 includes, for example, a holding portion 44, a fastening member 46, and collars 47, 48. The holding portion 44 is formed of a first holding member 42 and a second holding member 43 which are connected with each other via a hinge structure 41 to hold the overhead transmission line 100. The fastening member 46 maintains a holding state brought about by the first holding member 42 and the second holding member 43. The collars 47, 48 are interposed when the overhead transmission line 100 is held by the first holding member 42 and the second holding member 43.

The first holding member 42 and the second holding member 43 are kept in a state where one end portion (base end portion) of the first holding member 42 and one end portion (base end portion) of the second holding member 43 are connected with each other by the hinge structure 41, and another end portion (rotation end portion) of the first holding member 42 and another end portion (rotation end portion) of the second holding member 43 are positioned close to each other by the fastening member 46. The first holding member 42 and the second holding member 43 are connected with each other by the hinge structure 41 such that the first holding member 42 and the second holding member 43 are rotatable to each other. An example of the fastening member 46 may be a fastening unit including a bolt and a nut.

The fixed clamp 40 does not hold the overhead transmission line 100 in a rotatable manner so that the fixed clamp 40 is not equipped with the connecting member 25 unlike the movable clamp 20. As shown in FIG. 5, the fixed clamp 40 is provided with, in place of the connecting member 25, a connecting member 45 which has an arm shape and which is formed integrally with the first holding member 42. The connecting member 45 which has an arm shape extends from the vicinity of the hinge structure 41 outward in the radial direction about a position where the overhead transmission line 100 is held. The distal end portion of the connecting member 45 is formed into a bifurcated shape, and through holes 451, 452 are respectively formed in portions of the bifurcated portion along a direction orthogonal to the direction along the overhead transmission lines and to the longitudinal direction of the connecting member 45. One end portion of the support member 61, provided to the frame body 60, is inserted into the bifurcated portion of the connecting member 45, a bolt 614 is inserted into a through hole formed in the one end portion of the support member 61 and the through holes 451, 452 of the connecting member 45, and the bolt 614 is fastened. With such operations, the frame body 60 and the connecting member 45 are connected to each other.

Next, the structure of the frame body 60 will be described. As shown in FIG. 1, the frame body 60 includes a frame portion 62 and the support members 61. The frame portion 62 has an inverted triangular shape as viewed in the direction along the overhead transmission lines. The support members 61 are respectively provided to the three corner portions 63-1, 63-2, 63-3 of the frame portion 62. Each of two support members 61 out of three support members 61 is equipped with one movable clamp 20, and the remaining one support member 61 is equipped with one fixed clamp 40.

The frame portion 62 has a function of maintaining separations between the three support members 61, that is, a function of maintaining separations between the first movable clamp 20-1, the second movable clamp 20-2, and the fixed clamp 40. The shape of the frame portion 62 as viewed in the direction along the overhead transmission lines is not particularly limited provided that the frame portion 62 has a triangular shape, such as an equilateral triangle or an isosceles triangle. In the overhead transmission line spacer 1, the shape of the frame portion 62 is an isosceles triangular shape. Further, a mark M indicating a top side is put on the frame portion 62 so as to cause the first movable clamp 20-1 and the fixed clamp 40 to be positioned on the top side when the overhead transmission line spacer 1 is attached. As described above, one end portion of the support member 61 on the movable clamp 20 side or the fixed clamp 40 side has the through hole for connecting the support member 61 to the movable clamp 20 or the fixed clamp 40.

Next, a method for attaching the overhead transmission line spacer 1 of the present disclosure will be described. In attaching the overhead transmission line spacer 1 to three overhead transmission lines 100, in each of two movable clamps 20 and one fixed clamp 40, a bolt and a nut of the fastening members 26, 46 are loosened to release a holding state of the holding portions 24, 44, thus bringing the first holding members 22, 42 and the second holding members 23, 43 into an open state. Further, the connecting member 25 of the movable clamp 20 is set to a position other than the reference position.

In each of the two movable clamps 20 and the one fixed clamp 40, the overhead transmission line 100 is inserted into the holding portions 24, 44, and the first holding members 22, 42 and the second holding members 23, 43 are brought into a closed state to hold the overhead transmission line 100. Further, the bolt and the nut of the fastening members 26, 46 are rotated in a fastening direction to fasten the bolt and the nut. With such operations, the two movable clamps 20 and the one fixed clamp 40 can be attached to the overhead transmission lines 100 so that the overhead transmission line spacer 1 can be attached to a three-conductor transmission line.

EXAMPLE

Next, examples of the overhead transmission line spacer of the present disclosure will be described. However, the overhead transmission line spacer of the present disclosure is not limited to modes of the following examples.

In each of all of the overhead transmission line spacers of the examples and comparative examples, attached to the three-conductor transmission line, an inverted triangular frame body was used which is the frame body of the above-mentioned overhead transmission line spacer according to the embodiment of the present disclosure. The following clamps were equipped to the following positions.

Example 1

The first movable clamp (with a range of rotation angles between −80° and 80°) and the second movable clamp (with a range of rotation angles between −80° and 80°) equipped on the top side. One fixed clamp equipped on the bottom side.

Example 2

The first movable clamp (with a range of rotation angles between −80° and 80°) and one fixed clamp equipped on the top side. The second movable clamp (with a range of rotation angles between −80° and 80°) equipped on the bottom side.

Example 3

The first movable clamp (with a range of rotation angles between 90° and 90°) and one fixed clamp equipped on the top side. The second movable clamp (with a range of rotation angles between −40° to 40°) equipped on the bottom side.

Comparative Example 1

All of three clamps are fixed clamps.

Comparative Example 2

One movable clamp (with a range of rotation angles between −80° and 80°) and one fixed clamp equipped on the top side. One fixed clamp equipped on the bottom side.

Comparative Example 3

Two fixed clamps equipped on the top side, and one movable clamp (with a range of rotation angles between −80° and 80°) equipped on the bottom side.

The amount of displacement in the horizontal direction and the amount of displacement in the vertical direction of the above-mentioned overhead transmission line spacers of the examples and the comparative examples were obtained by simulations. For analysis software, CAFSS PRO, version of 1.1.3, was used. The amount of displacement in the horizontal direction and the amount of displacement in the vertical direction were obtained from the behavior of the center of an inverted triangular plane formed by the inverted triangular frame body of the spacer attached to the vicinity of the center of a span.

Figure 6:
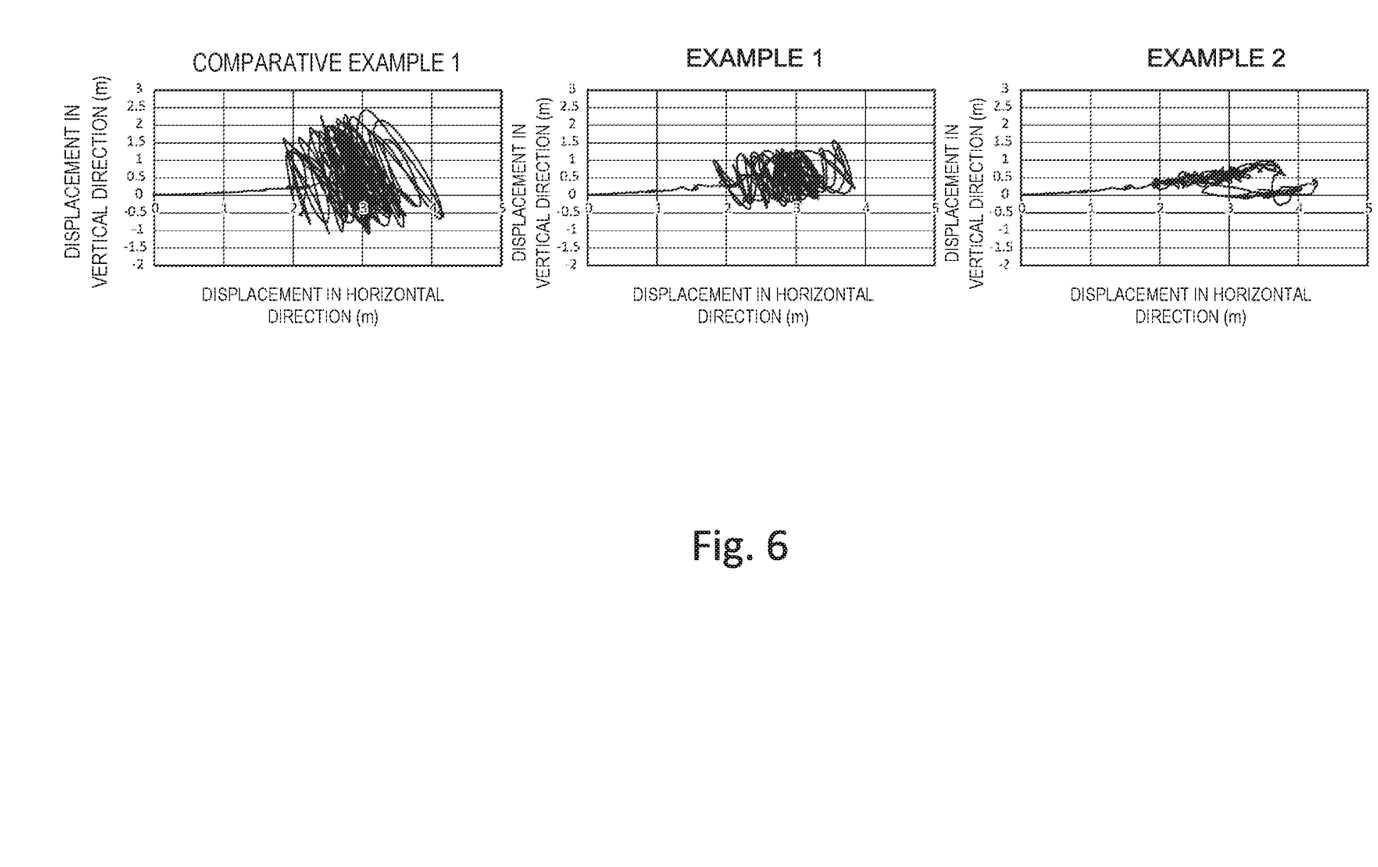
FIG. 6 is a graph showing simulation results on a dead end span with respect to the overhead transmission line spacers of examples and a comparative example.
Figure 7:
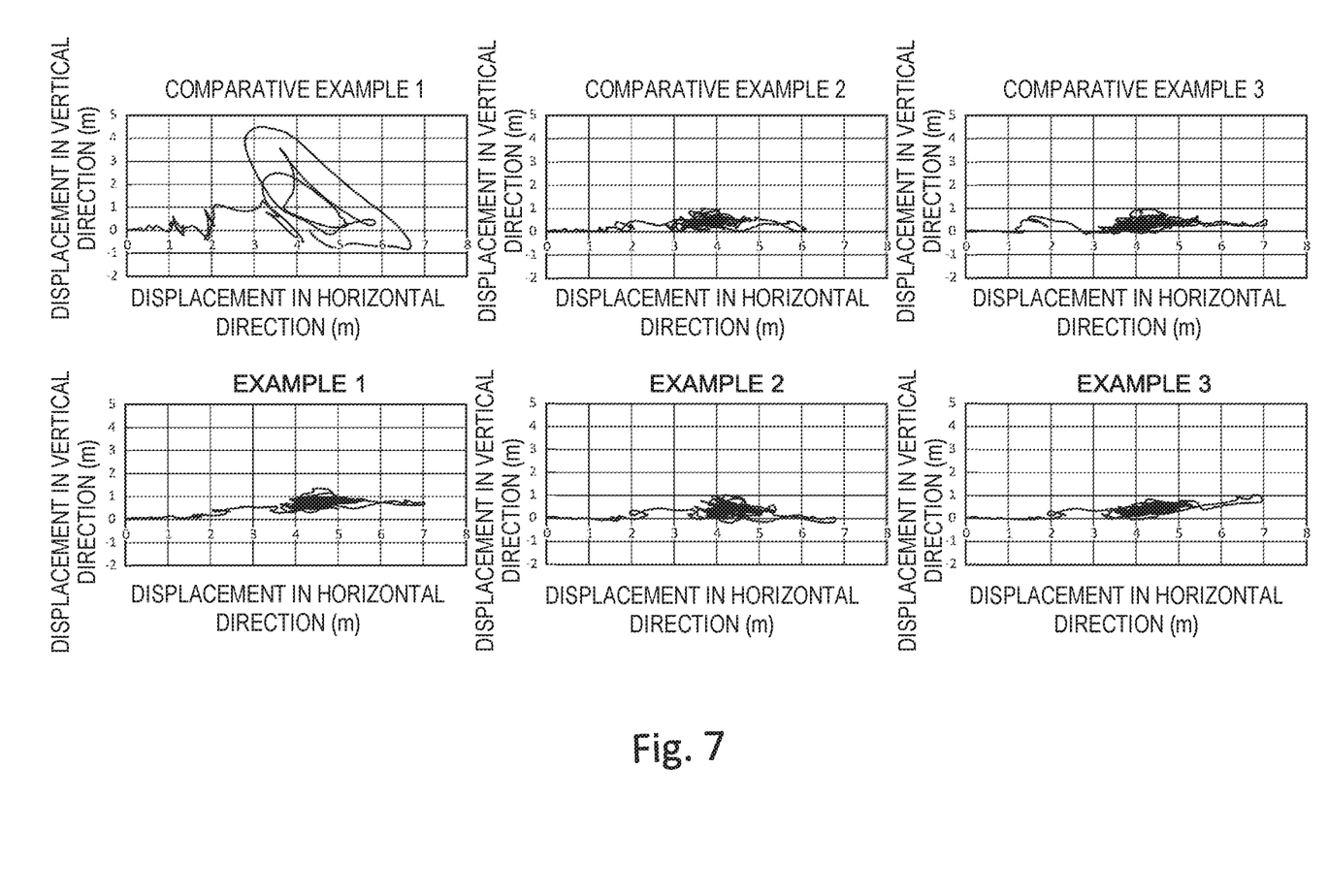
FIG. 7 is a graph showing simulation results on a suspension span with respect to the overhead transmission line spacers of the examples and the comparative examples.

FIG. 6 shows simulation results on a dead end span with respect to the overhead transmission line spacers of the examples and the comparative examples. FIG. 7 shows simulation results on a suspension span.

As shown in FIG. 6, in the example 1 where the first movable clamp (with a range of rotation angles between −80° and 80°) and the second movable clamp (with a range of rotation angles between −80° and 80°) are equipped on the top side, and one fixed clamp is equipped on the bottom side and in the example 2 where the first movable clamp (with a range of rotation angles between −80° and 80°) and one fixed clamp are equipped on the top side, and the second movable clamp (with a range of rotation angles between −80° and 80°) is equipped on the bottom side, the amount of displacement in the vertical direction is significantly reduced in the dead end span compared with the comparative example 1 where all of three clamps are fixed clamps. Therefore, in the examples 1, 2 where two movable clamps having the same range of rotation angles are equipped, it is found that galloping caused by strong wind in a three-conductor transmission line can be suppressed. Particularly, in the example 2 where one movable clamp and one fixed clamp are equipped on the top side, and one movable clamp is equipped on the bottom side, it is found that the amount of displacement in the vertical direction is further reduced so that galloping caused by strong wind can be suppressed with more certainty compared with the example 1 where two movable clamps are equipped on the top side, and one fixed clamp is equipped on the bottom side.

As shown in FIG. 7, in the examples 1, 2, 3 where two movable clamps are equipped, the amount of displacement in the vertical direction is significantly reduced also in a suspension span compared with the comparative example 1, where all of three clamps are fixed clamps, and the comparative examples 2, 3, where one movable clamp is equipped on either one of the top side or the bottom side. Therefore, in the examples 1, 2, 3 where two movable clamps are equipped, it is found that galloping caused by strong wind in the three-conductor transmission line can be suppressed. Particularly, in the example 2 where one movable clamp and one fixed clamp are equipped on the top side, and a movable clamp having the same range of rotation angles as the movable clamp on the top side is equipped on the bottom side, it is found that the amount of displacement in the vertical direction is further reduced so that galloping caused by strong wind can be suppressed with more certainty compared with the example 3, where one movable clamp and one fixed clamp are equipped on the top side, and a movable clamp having a range of rotation angles different from that of the movable clamp on the top side is equipped on the bottom side.

Even when the overhead transmission line spacer of the present disclosure is attached to a three-conductor transmission line formed of three overhead transmission lines, the three overhead transmission lines have different cross-sectional shapes of snow and ice accretion so that galloping caused by strong wind in the three-conductor transmission line can be suppressed. Therefore, the overhead transmission line spacer of the present disclosure has a high utility value in the field of a three-conductor transmission line used in a cold district where snow and ice accretion occur on overhead transmission lines.

What is claimed is:

1. An overhead transmission line spacer comprising:
    three clamps configured. to individually hold three overhead transmission lines: and
    a frairic body including support members acid a frame portion, and configured to maintain separations between the three overhead transmission lines via the three clamps, the clamps being attached to the support members, and the frame portion maintaining separations between the support members, wherein
    two out of the three clamps are movable clamps, each of which is configured to hold one of the overhead transmission lines in a rotatable manner about the one of the overhead transmission lines, and one out of the three clamps is a fixed clamp configured to hold one of the overhead transmission lines without allowing rotation, wherein
    the frame body has an inverted triangular shape,
    the fixed clamp is positioned upward of at least one movable clamp,
    of the two movable clamps, a first movable clamp is attached to a top side of the frame body and a second movable clamp is attached to a bottom side of the frame body,
    the first movable clamp and the second movable clamp have the same structure, and
    the three overhead transmission lines have different torsional rigidities.

2. The overhead transmission ine spacer according to
    in the at least one out of two movable clamps, a holding portion configured to hold the one of the overhead transmission lines rotates about the one of the overhead transmission lines within a range of rotation angles between −90° and 90° with a straight line connecting a center portion of the holding portion in a direction perpendicular to a mgitudinal direction of the one of the overhead transmission lines and a respective one of the support members taken as a reference position.

3. The overhead transmission line spacer according to claim 1, wherein a range of rotation angles of a movable clamp positioned on a top side is equal to a range of rotation angles of a movable clamp positioned on a bottom side.

4. The overhead transmission line spacer according to claim 2, wherein a range of rotation angles of a movable clamp positioned on a top side is equal to a range of rotation angles of a movable clamp positioned. on a bottom side.

5. The overhead transmission line spacer according to claim 2, wherein the at least one out of two movable clamps rotates about one of the overhead transmission lines within a range of rotation angles of equal to or more than a range between −70° and 70° and equal to or less than a range between −90° and 90° with the straight line taken as a reference position.

* * * * *